(12) United States Patent
Abe et al.

(10) Patent No.: US 11,254,114 B2
(45) Date of Patent: Feb. 22, 2022

(54) METHOD FOR MANUFACTURING MULTILAYER MEMBER

(71) Applicant: Sika Hamatite Co., LTD., Hiratsuka (JP)

(72) Inventors: Megumi Abe, Kanagawa (JP); Yuichi Matsuki, Kanagawa (JP)

(73) Assignee: Sika Hamatite Co., LTD.

( * ) Notice: Subject to any disclaimer, the term of this patent is extended or adjusted under 35 U.S.C. 154(b) by 0 days.

(21) Appl. No.: 16/973,969

(22) PCT Filed: Jun. 10, 2019

(86) PCT No.: PCT/JP2019/022882
§ 371 (c)(1),
(2) Date: Dec. 10, 2020

(87) PCT Pub. No.: WO2019/240063
PCT Pub. Date: Dec. 19, 2019

(65) Prior Publication Data
US 2021/0245489 A1     Aug. 12, 2021

(30) Foreign Application Priority Data

Jun. 14, 2018   (JP) .............................. JP2018-113559

(51) Int. Cl.
*B32B 38/00* (2006.01)
*B32B 37/12* (2006.01)

(52) U.S. Cl.
CPC .......... *B32B 38/0036* (2013.01); *B32B 37/12* (2013.01); *B32B 2037/1253* (2013.01)

(58) Field of Classification Search
CPC ............... B32B 38/0036; B32B 37/12; B32B 2037/1253; B29C 65/483; B29C 66/7465;
(Continued)

(56) References Cited

U.S. PATENT DOCUMENTS

| 2017/0130106 A1* | 5/2017 | Matsuki ................. C08G 18/12 |
| 2019/0030758 A1 | 1/2019 | Abe et al. |
| 2019/0030830 A1* | 1/2019 | Abe ........................ B32B 37/12 |

FOREIGN PATENT DOCUMENTS

| EP | 3406425 A1 | 11/2018 |
| EP | 3406659 A1 | 11/2018 |

(Continued)

*Primary Examiner* — Vishal I Patel
(74) *Attorney, Agent, or Firm* — Thorpe North & Western (57) ABSTRACT

A method for manufacturing a multilayer member that provides excellent adhesiveness without using a primer. An embodiment of the present invention provides a method for manufacturing a multilayer member including a first member containing a crystalline thermoplastic resin, an adhesion layer, and a second member in this order, the method including a surface treatment step of performing dry treatment on a surface of the first member containing a crystalline thermoplastic resin, satisfying the following condition A, an adhesive application step of forming an adhesive layer in a surface subjected to the dry treatment of the first member by applying an adhesive to the surface subjected to the dry treatment of the first member without interposing a primer composition, and an adhering step of making the second member adhere onto the adhesive layer.

11 Claims, 1 Drawing Sheet

(58) Field of Classification Search
CPC . B29C 65/523; B29C 66/742; B29C 66/1122; B29C 66/45; B29C 65/526; B29C 65/485; B29C 66/7392; B29C 66/028; B29C 65/525; B29C 66/73773; B29C 65/522; B29C 66/73775; B29C 66/7394; B29C 65/521
See application file for complete search history.

(56) References Cited

FOREIGN PATENT DOCUMENTS

| | | | |
|---|---|---|---|
| JP | 11-350381 A | 12/1999 | |
| JP | 2001-138457 A | 5/2001 | |
| JP | 2009-209199 A | 9/2009 | |
| JP | 2009-237376 A | 10/2009 | |
| JP | 2017-128052 A | 7/2017 | |
| WO | 2017/126361 A1 | 7/2017 | |
| WO | 2017/126362 A1 | 7/2017 | |
| WO | WO-2017126362 A1 * | 7/2017 | ............. B29C 59/16 |

* cited by examiner

METHOD FOR MANUFACTURING MULTILAYER MEMBER

TECHNICAL FIELD

The present invention relates to a method for manufacturing a multilayer member.

BACKGROUND ART

In the related art, a steel plate has been used in interior and exterior members of an automobile such as a body, a front door, a rear door, a back door, a front bumper, a rear bumper, and a rocker molding of an automobile. However, a crystalline thermoplastic resin such as a polypropylene resin has been increasingly used in part from the perspective of reducing the weight of an automobile.

In a case where a resin is used in interior and exterior members of an automobile in this way, a primer composition is usually applied to an adhering surface of a resin member, and then an adhesive is applied to perform adhering.

Additionally, a known method for manufacturing a multilayer member is designed to provide excellent adhesiveness without using a primer, and is a method for manufacturing a multilayer member including a first member containing a crystalline thermoplastic resin, an adhesion layer, and a second member in this order. The method includes a surface treatment step of performing dry treatment on a surface of the first member containing a crystalline thermoplastic resin, satisfying a specific condition, an adhesive application step of forming an adhesive layer in a surface subjected to the dry treatment of the first member by applying an adhesive to the surface subjected to the dry treatment of the first member without interposing a primer composition, and an adhering step of making the second member adhere onto the adhesive layer (for example, Patent Document 1).

CITATION LIST

Patent Literature

Patent Document 1: JP 2017-128052 A

SUMMARY OF INVENTION

Technical Problem

Recently, in the rise of the level of requirement for an automobile such as safety and fuel economy, there is a demand for further improvement of the adhesiveness of a multilayer member (adhesiveness between adhering members).

In such a situation, when the present inventors have manufactured a multilayer member by using dry treatment and an adhesive without using a primer with reference to Patent Document 1, it has been found that the adhesiveness of the multilayer member is not necessarily sufficient.

Then, in view of the above-described circumstances, an object of the present invention is to provide a method for manufacturing a multilayer member that provides excellent adhesiveness without using a primer.

Solution to Problem

As a result of earnest studies on the above-described problems, the present inventors have found that the above-described problems can be solved by performing dry treatment on a member containing a crystalline thermoplastic resin, satisfying a specific condition.

In other words, the present inventors have found that the above-described problems can be solved by the following configurations.

[1] A method for manufacturing a multilayer member including a first member containing a crystalline thermoplastic resin, an adhesion layer, and a second member in this order, the method including a surface treatment step of performing dry treatment on a surface of the first member containing a crystalline thermoplastic resin, satisfying condition A, an adhesive application step of forming an adhesive layer in a surface subjected to the dry treatment of the first member by applying an adhesive to the surface subjected to the dry treatment of the first member without interposing a primer composition, and an adhering step of making the second member adhere onto the adhesive layer.

(Condition A) The dry treatment of the first member is flame treatment, and in the flame treatment, the surface of the first member is subjected to a reducing flame of a flame.

[2] The method for manufacturing a multilayer member according to [1], wherein the second member is a coated member.

[3] The method for manufacturing a multilayer member according to [1] or [2], wherein the first member is a composite material including a polyolefin resin as the crystalline thermoplastic resin, and an inorganic substance.

[4] The method for manufacturing a multilayer member according to any one of [1] to [3], wherein the adhesive is at least one selected from the group consisting of a urethane-based adhesive, an epoxy-based adhesive, a modified silicone-based adhesive, and an acrylic-based adhesive.

[5] The method for manufacturing a multilayer member according to any one of [1] to [4], wherein the second member contains a crystalline thermoplastic resin, the method further includes a surface treatment step of performing dry treatment on a surface of the second member before the adhering step, satisfying condition A2, and in the adhering step, a surface subjected to the surface treatment of the second member is made adhere onto the adhesive layer.

(Condition A2) The dry treatment of the second member is flame treatment, and in the flame treatment, the surface of the second member is subjected to a reducing flame of a flame.

Advantageous Effects of Invention

As described below, according to an embodiment of the present invention, a method for manufacturing a multilayer member that provides excellent adhesiveness without using a primer can be provided.

DESCRIPTION OF EMBODIMENTS

A method for manufacturing a multilayer member according to an embodiment of the present invention will be described below.

Note that in the present specification, value range indicated by using "from . . . to . . . " means the range including the former value as a lower limit value and the latter value as an upper limit value.

The method for manufacturing a multilayer member according to an embodiment of the present invention (hereinafter, may simply be referred to as the "method according to an embodiment of the present invention") is a method for manufacturing a multilayer member including a first member containing a crystalline thermoplastic resin, an adhesion layer, and a second member in this order, and the method includes the following three steps.

(1) Step 1: Surface Treatment Step

A step of performing dry treatment on a surface of the first member containing a crystalline thermoplastic resin, satisfying condition A described below.

(2) Step 2: Adhesive Application Step

A step of forming an adhesive layer in a surface subjected to the dry treatment of the first member by applying an adhesive to the surface subjected to the dry treatment of the first member without interposing a primer composition.

(3) Step 3: Adhering Step

A step of making the second member adhere onto the adhesive layer.

It is presumed that the method according to an embodiment of the present invention includes such a configuration, and thus a multilayer structure to be obtained exhibits excellent adhesive properties. Although the reason is not clear, it is presumed as follows.

It is considered that in an embodiment of the present invention, since a surface of a member containing a crystalline thermoplastic resin is subjected to dry treatment, satisfying condition A described below (hereinafter, condition A is also referred to as a "specific condition"), a condition is milder than the case where the surface is subjected to an oxidizing flame (outer flame) of a flame in the dry treatment, excessive treatment due to the dry treatment can be suppressed, and the surface of the member is made hydrophilic without destroying the crystallinity of an outermost surface of the member. Thus, it is considered that while an adhesive is fit in the surface of the member made hydrophilic to form an adhesive layer sufficiently adhering to all the surface, a crystal structure of the outermost surface of the member acts as an anchor to strongly fix an adhesion layer formed from the adhesive layer to the member. As a result, it is considered that a multilayer member that provides excellent adhesiveness without using a primer composition can be obtained.

First, the method according to an embodiment of the present invention will be described with reference to the drawing.

Figure 1:
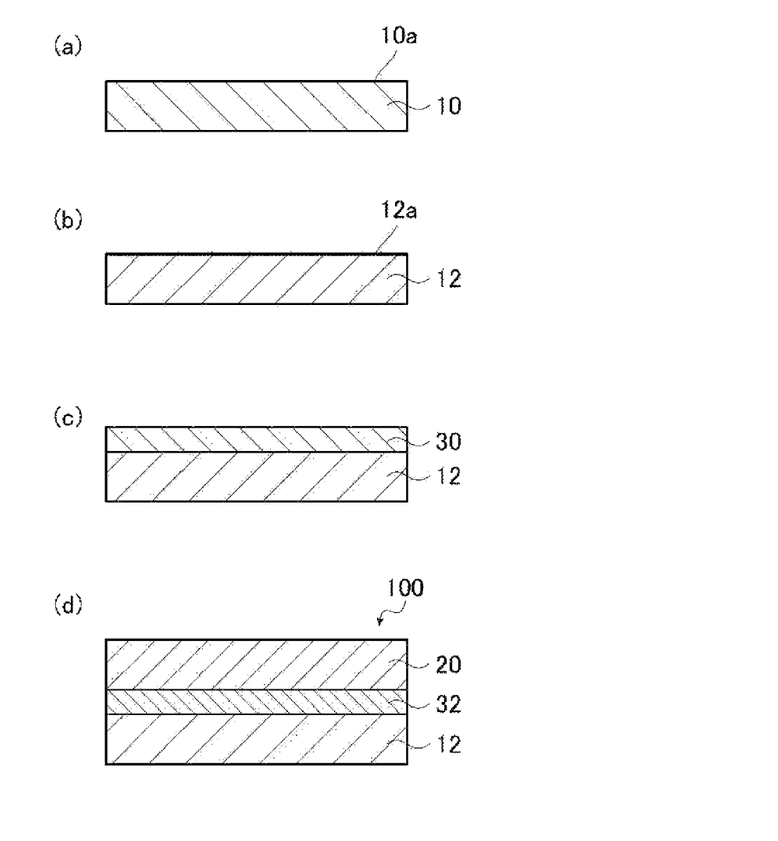
FIG. 1 is a schematic cross-sectional view illustrating a method for manufacturing according to an embodiment of the present invention in the order of steps.

FIG. 1 is a schematic cross-sectional view illustrating the method according to an embodiment of the present invention in the order of steps.

FIG. 1(a) illustrates a first member 10 used at the surface treatment step.

First, at the surface treatment step, a surface 10a of the first member 10 is subjected to dry treatment, satisfying the specific condition. In this way, a first member 12 subjected to the dry treatment is obtained (FIG. 1(b)).

Next, at the adhesive application step, an adhesive layer 30 is formed in a surface 12a (FIG. 1(c)) by applying an adhesive to the surface 12a subjected to the dry treatment of the first member 12 subjected to the dry treatment without interposing a primer composition.

Further, at the adhering step, a second member 20 is made adhere onto the adhesive layer 30. In this way, a multilayer member 100 including the first member 12, an adhesion layer 32 (a layer obtained by curing the adhesive layer 30), and the second member 20 in this order is obtained (FIG. 1(d)).

Each step will be described in detail below.

Step 1: Surface Treatment Step

The surface treatment step is a step of subjecting a surface of a first member containing a crystalline thermoplastic resin to dry treatment, satisfying condition A described below.

First Member

The first member used at the surface treatment step is not particularly limited as long as the first member is a member (preferably, a base material) containing a crystalline thermoplastic resin. Note that in a case where the multilayer member manufactured by the method according to an embodiment of the present invention is used as an exterior member for an automobile such as a back door of an automobile, the first member is preferably used as a member located in an inner side (inner member).

The crystalline thermoplastic resin is not particularly limited as long as the crystalline thermoplastic resin is a thermoplastic resin having crystallinity, and specific examples of the crystalline thermoplastic resin include a polyolefin resin such as polyethylene, polypropylene, and polybutylene; a methacrylic resin such as polymethyl methacrylate; a polystyrene resin such as polystyrene, ABS, and AS; a polyester resin such as polyethylene terephthalate (PET), polybutylene terephthalate (PBT), polytrimethylene terephthalate, polyethylene naphthalate (PEN), and poly 1,4-cyclohexyldimethylene terephthalate (PCT); a polyamide resin selected from a nylon resin and a nylon copolymer resin such as polycaproamide (nylon 6), polyhexamethylene adipamide (nylon 66), polyhexamethylene sebacamide (nylon 610), polyhexamethylene dodecamide (nylon 612), polydodecanamide (nylon 12), polyhexamethylene terephthalamide (nylon 6T), polyhexamethylene isophthalamide (nylon 6I), a polycaproamide/polyhexamethylene terephthalamide copolymer (nylon 6/6T), a polyhexamethylene adipamide/polyhexamethylene terephthalamide copolymer (nylon 66/6T), and a polyhexamethylene adipamide/polyhexamethylene isophthalamide copolymer (nylon 66/6I); a polyvinyl chloride resin; polyoxymethylene (POM); a polycarbonate (PC) resin; a polyphenylene sulfide (PPS) resin; a modified polyphenylene ether (PPE) resin; a polyetherimide (PEI) resin; a polysulfone (PSF) resin; a polyethersulfone (PES) resin; a polyketone resin; a polyether nitrile (PEN) resin; a polyether ketone (PEK) resin; a polyether ether ketone (PEEK) resin; a polyetherketoneketone (PEKK) resin; a polyimide (PI) resin; a polyamide-imide (PAI) resin; a fluorine resin; and modified resins obtained by modifying these resins or mixtures of these resins. Among these, a polyolefin resin is preferable, polyethylene and polypropylene are more preferable, and polypropylene is even more preferable. The first member may contain two or more kinds of crystalline thermoplastic resins.

The content of the crystalline thermoplastic resin in the first member is preferably from 10 to 100 mass %, and more preferably from 60 to 100 mass %.

The first member is preferably a composite member containing a crystalline thermoplastic resin and an inorganic substance. Examples of the inorganic substance include silica, titanium oxide, magnesium oxide, antimony oxide, aluminum hydroxide, magnesium hydroxide, calcium hydroxide, calcium carbonate, talc, mica, glass fiber, carbon black, graphite, and carbon fiber. The first member may contain two or more kinds of inorganic substances.

In a case where the first member is a base material (flat plate-like shape), the thickness of the first member is not particularly limited, and is preferably from 1 μm to 100 mm.

Dry Treatment

The dry treatment is not particularly limited as long as the dry treatment is dry treatment that satisfies condition A (specific condition) described below. The dry treatment may be performed on all the surface or a portion of the surface of the first member. In a case where the first member is a base material, the dry treatment is preferably performed on one surface of the base material.

(Condition A) The dry treatment of the first member is flame treatment, and in the flame treatment, the surface of the first member is subjected to a reducing flame of a flame.

The dry treatment may include single dry treatment (once) (for example, single sweeping), or a plurality of times of unit dry treatment (a plurality of times) (for example, a plurality of times of sweeping). When the dry treatment includes a plurality of times of unit dry treatment, the unit dry treatment may be performed without interval (continuous treatment), or the member may be subjected to the unit dry treatment and cooling, and then the next unit dry treatment may be performed (intermittent treatment).

Flame Treatment

The flame treatment is a method for treating a surface by using a flame.

As the flame treatment, a known method, for example, a method of using a combustion device such as a burner can be used.

Flame

In an embodiment of the present invention, flame in flame treatment means all the flame ejected from a tip of the combustion device such as a burner described above.

The flame usually has an oxidizing flame (outer flame) and a reducing flame (inner flame).

Oxidizing Flame

Oxidizing flame refers to an outer portion of a flame (a region where oxygen is sufficiently supplied and fuel gas is completely burned). The oxidizing flame has the highest temperature in all the flame.

Reducing Flame

Reducing flame refers to an inner portion of the oxidizing flame (a region where oxygen is not sufficiently supplied and fuel gas is incompletely burned) in a flame. The reducing flame has lower temperature than the temperature of the oxidizing flame.

Length of Flame

The overall length of the flame (the length from the tip of the combustion device to a tip of the flame) that can be used (for example, experimentally or industrially) at the surface treatment step is preferably from 20 to 300 mm, and more preferably 50 mm or greater, from the perspective of excellent workability.

Length of Reducing Flame

The length of the reducing flame (the length from the tip of the combustion device to a tip of the reducing flame (inner flame)) that can be used (for example, experimentally or industrially) at the surface treatment step can be set to from 3 to 150 mm, for example, and is more preferably 5 mm or greater from the perspective of excellent workability.

Position of Surface of Base Material and Reducing Flame

In an embodiment of the present invention, a position of a surface of the base material and the reducing flame is not particularly limited. The surface of the base material may be subjected to the reducing flame. A position of the base material can be a position between the tip of the combustion device (for example, a burner) and the tip of the reducing flame.

The position of the base material is preferably at a central portion between the tip of the combustion device and the tip of the reducing flame in the reducing flame from the perspective of achieving more excellent effect according to an embodiment of the present invention and achieving excellent workability in consideration of the range of a flame flaring (fluctuation) during the dry treatment work.

Distance Between Tip of Combustion Device and Base Material

The distance between the tip of the combustion device and the base material (hereinafter may simply be referred to as the "distance") can be set to, for example, from 3 to 150 mm, and is preferably from 5 to 75 mm from the perspective of achieving more excellent effect according to an embodiment of the present invention and achieving excellent workability in consideration of the range of flame flaring (fluctuation) during the dry treatment work.

Fuel Gas

Examples of fuel gas used in the flame treatment include inflammable gas (for example, propane gas, butane gas, city gas, and natural gas), mixed gas, or combustion gas including aerosol.

Gas Pressure

From the perspective of achieving more excellent effect according to an embodiment of the present invention, gas pressure in the flame treatment is preferably from 0.005 to 10 MPa, and more preferably from 0.01 to 1.5 MPa.

Flame Treatment Speed

Flame treatment speed is preferably from 100 to 2000 mm/sec, and more preferably from 200 to 1000 mm/sec.

Number of Times of Flame Treatment

The number of times of the flame treatment is preferably from 1 to 5, and more preferably from 1 to 2.

From the perspective of achieving more excellent effect according to an embodiment of the present invention, making the surface hydrophilic and/or suppressing excessive treatment on the surface, the number of times of the flame treatment is preferably from 1 to 2.

Shape of Tip of Combustion Device

A shape of the tip of the combustion device (a burner or the like) is not particularly limited. Examples of the shape include a circular shape, an elliptical shape, a flat shape, a rectangular shape, and a square shape. Note that the inside of the shape described above includes a cavity.

In a case where the tip of the combustion device has a circular shape, an inner diameter of the tip is preferably from 5 to 30 mm.

In a case where the tip of the combustion device has a shape other than a circular shape, the lateral width of the tip is preferably, for example, from 5 to 500 mm. Additionally, the vertical width of the tip can be set to, for example, from 3 to 300 mm.

Flame Shape

A shape of a flame ejected from the tip of the combustion device is not particularly limited. Examples of the shape include a rod shape, a fan shape, and a curtain shape.

Wetting Index Value

The surface subjected to the dry treatment of the first member obtained at the surface treatment step has a wetting index value of preferably from 34 to 60 dyn/cm, more preferably from 38 to 58 dyn/cm, and more preferably from 40 to 50 dyn/cm, from the perspective of achieving more excellent effect according to an embodiment of the present invention, making the surface sufficiently hydrophilic and/or suppressing excessive treatment due to the dry treatment on the surface.

In an embodiment of the present invention, the wetting index value has been measured by using a wetting reagent (available from Wako Pure Chemical Industries, Ltd.).

Step 2: Adhesive Application Step

The adhesive application step is a step of forming an adhesive layer in a surface subjected to the dry treatment of the first member by applying an adhesive to the surface subjected to the dry treatment of the first member without interposing a primer composition.

Adhesive

The adhesive is not particularly limited, and specific examples of the adhesive include an acrylic-based adhesive, a rubber-based adhesive, a silicone-based adhesive, a urethane-based adhesive, an α-olefinic adhesive, an ether-based adhesive, an ethylene-vinyl acetate resin-based adhesive, an epoxy resin-based adhesive, a vinyl chloride resin-based adhesive, a chloroprene rubber-based adhesive, a cyanoacrylate-based adhesive, an aqueous polymer-isocyanate-based adhesive, a styrene-butadiene rubber-based adhesive, a nitrile rubber-based adhesive, a nitrocellulose-based adhesive, a reactive hot melt adhesive, a phenolic resin-based adhesive, a modified silicone-based adhesive, a polyamide resin-based adhesive, a polyimide-based adhesive, a polyurethane resin-based adhesive, a polyolefin resin-based adhesive, a polyvinyl acetate resin-based adhesive, a polystyrene resin solvent-based adhesive, a polyvinyl alcohol-based adhesive, a polyvinylpyrrolidone resin-based adhesive, a polyvinyl butyral resin-based adhesive, a polybenzimidazole-based adhesive, a polymethacrylate resin-based adhesive, a melamine resin-based adhesive, a urea resin-based adhesive, and a resorcinol-based adhesive. The adhesive is preferably at least one selected from the group consisting of a urethane-based adhesive, an epoxy-based adhesive, a modified silicone-based adhesive, and an acrylic-based adhesive, and more preferably a urethane-based adhesive.

Preferably, the urethane-based adhesive and the epoxy-based adhesive are a one-part or two-part adhesive.

Examples of a one-part urethane-based adhesive include a moisture-curing adhesive including a urethane prepolymer having an isocyanate group.

Examples of a two-part urethane-based adhesive include an adhesive containing a main agent including a urethane prepolymer, and a curing agent including a polyol.

Examples of a one-part epoxy-based adhesive include a normal temperature-curing or heating-curing adhesive including a latent curing agent such as ketimine, oxazolidine, and an aldimine-based compound and a liquid epoxy resin.

Examples of a two-part epoxy resin-based adhesive include an adhesive containing a main agent selected from a liquid epoxy resin (for example, a bisphenol A type epoxy resin, a bisphenol F type epoxy resin, a bisphenol AD type epoxy resin, or a novolac type epoxy resin) and a curing agent (for example, an amine-based curing agent such as an open-chain aliphatic amine, a cyclic aliphatic amine, or an aromatic amine, a nitrogen-containing aromatic amine such as an imidazole compound, an amidoamine curing agent, and a ketimine).

Application Method

A method for applying the adhesive to the surface subjected to the dry treatment of the first member is not particularly limited, and examples of the method include a dip coating method, a coating method with a double roll coater, a slit coater, an air knife coater, a wire bar coater, a slide hopper, spray coating, a blade coater, a doctor coater, a squeeze coater, a reverse roll coater, a transfer roll coater, an extrusion coater, a curtain coater, a dip coater, a die coater, or a gravure roll, a screen printing method, a dip coating method, a spray coating method, a spin coating method, and an inkjet method.

The thickness of the adhesive layer formed is not particularly limited and is preferably from 0.1 to 20 mm.

Step 3: Adhering Step

The adhering step is a step of making the second member adhere onto the adhesive layer described above.

In this way, a multilayer member including the first member, the adhesion layer (layer obtained by curing the adhesive layer), and the second member in this order is obtained.

Second Member

A material for the second member is not particularly limited, and examples of the material include a resin, glass, and a metal. Examples of the resin include the crystalline thermoplastic resin described above.

Note that in a case where a multilayer member manufactured by the method according to an embodiment of the present invention is used as an exterior member for an automobile such as a back door of an automobile, the second member is preferably used as a member located in an outer side (outer member).

From the perspective of further improving the adhesiveness between the second member and the adhesion layer, a surface of the second member may be subjected to coating or the above-described dry treatment before performing adhering of the second member.

Adhering Method

A method for making the second member adhere onto the adhesive layer is not particularly limited, and examples of the method include a compression bonding method. Note that to cure the adhesive, heating treatment or the like may be performed after performing adhering of the second member.

In a case where the second member contains a crystalline thermoplastic resin, preferably a surface treatment step of performing dry treatment on a surface of the second member, satisfying the following condition A2 is further performed before the adhering step. Note that at the adhering step, a surface subjected to the surface treatment of the second member is made adhere onto the adhesion layer described above.

(Condition A2) The dry treatment of the second member is flame treatment, and in the flame treatment, the surface of the second member is subjected to a reducing flame of a flame.

A specific example and a suitable aspect of the surface treatment step is identical to those of step 1 described above.

Application

Since a multilayer member manufactured by the method according to an embodiment of the present invention has excellent adhesiveness, the multilayer member is particularly useful for interior and exterior members of an automobile, such as a body, a front door, a rear door, a back door, a front bumper, a rear bumper, and a rocker molding of an automobile.

EXAMPLES

An embodiment of the present invention will be described in further detail below by way of examples. However, an embodiment of the present invention is not limited to these examples.

Preparation of Adhesive

Components of Table 1 below were mixed by composition (part by mass) shown in Table 1 by using a stirrer, and a main agent indicated in an upper part of Table 1 and a curing agent indicated in a lower part of Table 1 were prepared.

Next, 100 g of the prepared main agent and 10 g of the curing agent were mixed to obtain adhesives 1 to 2.

Adhesive 1 is a urethane-based adhesive, and adhesive 2 is an epoxy-based adhesive.

TABLE 1

|  | Table 1 | Adhesive 1 | Adhesive 2 |
|---|---|---|---|
| Main agent | Polymer 1 | 42.4 | |
|  | Polymer 2 | | 29.9 |
|  | Epoxy resin 1 | | 2.8 |
|  | Epoxy resin 2 | | 11.4 |
|  | Compound 1 | 1.7 | |
|  | Compound 2 | 0.3 | |
|  | Carbon black | 20.6 | 3.3 |
|  | Calcium carbonate 1 | 19.3 | 7.9 |
|  | Calcium carbonate 2 | | 41.5 |
|  | Plasticizer 1 | 15.5 | |
|  | Plasticizer 2 | | 3.1 |
|  | Catalyst 1 | 0.2 | |
|  | Total | 100.0 | 100.0 |
| Curing agent | Compound 3 | 45.9 | 9.8 |
|  | Compound 4 | 5.0 | |
|  | Compound 5 | 2 | |
|  | Compound 6 | | 5.2 |
|  | Compound 7 | | 2.5 |
|  | Compound 8 | | 31.3 |
|  | Calcium carbonate 2 | 46.8 | 46.0 |
|  | Catalyst 1 | 0.3 | |
|  | Catalyst 2 | | 5.2 |
|  | Total | 100.0 | 100.0 |
| Main agent/curing agent (mass ratio) | | 10/1 | 10/1 |

Details of each of the components in Table 1 are as follows.

Main Agent

Polymer 1: Urethane Prepolymer Synthesized as Follows

A urethane prepolymer (Polymer 1) in which the content of an isocyanate group was 2.10% was synthesized by mixing 700 g of polyoxypropylene diol (average molecular weight: 2000), 300 g of polyoxypropylene triol (average molecular weight: 3000), and 499 g of 4,4'-diisocyanate phenylmethane (molecular weight: 250) (NCO/OH=2.0 in this case), further adding 500 g of diisononyl phthalate, and stirring in a nitrogen gas stream at 80° C. for 12 hours to allow them to react.

Polymer 2: Kaneka MS polymer S203 (available from Kaneka Corporation)

Epoxy resin 1: ADEKA RESIN EP-4100 (available from ADEKA Corporation)

Epoxy resin 2: ADEKA RESIN EP-4006 (available from ADEKA Corporation)

Compound 1: Isocyanurate of hexamethylene diisocyanate (Tolonate HDT, available from Perstorp)

Compound 2: Dimerone (available from Yasuhara Chemical Co., Ltd.)

Carbon black: #200 MP (available from NSCC Carbon Co., Ltd.)

Calcium carbonate 1: Super S (available from Maruo Calcium Co., Ltd.)

Calcium carbonate 2: KALFAIN 200 (available from Maruo Calcium Co., Ltd.)

Plasticizer 1: Diisononyl phthalate (available from J-PLUS, Co., Ltd.)

Plasticizer 2: Shellsol™ (available from Japan Chemtech Co. Ltd.)

Catalyst 1: Dimorpholinodiethyl ether (available from San-Apro Ltd.)

Curing Agent

Compound 3: Trifunctional polypropylene polyol (Excenol 1030, available from Asahi Glass Co., Ltd.)

Compound 4: Polybutadienediol (Poly bd R-45 HT, available from Idemitsu Kosan Co., Ltd.; hydroxyl value: 0.8 mol/kg)

Compound 5: Terpineol (available from Yasuhara Chemical Co., Ltd.)

Compound 6: 3-glycidoxypropyltrimethoxysilane Sila-Ace 5-510 (available from Chisso Corporation)

Compound 7: Vinyltrimethoxysilane KBM 1003 (available from Shin-Etsu Chemical Co., Ltd.)

Compound 8: Ketimine-type latent curing agent Epicure H-30 (available from Mitsubishi Chemical Corporation)

Calcium carbonate 2: KALFAIN 200 (available from Maruo Calcium Co., Ltd.)

Catalyst 1: Dimorpholinodiethyl ether (available from San-Apro Ltd.)

Catalyst 2: Tin catalyst NEOSTANN U-303 (available from Nitto Kasei Co., Ltd.)

Manufacturing of Multilayer Member

Surface Treatment Step

One surface of a base material (first member) (content of polypropylene: 80 mass %; content of inorganic substance (glass filler): 20 mass %) (width: 25 mm, length: 120 mm, thickness: 3 mm) formed from a polypropylene composite material (R-200G, available from Prime Polymer Co., Ltd.) was subjected to dry treatment under a treatment condition described in Table 2. In "Treatment method" of Table 2, "Flame" indicates flame treatment. "Oxidizing flame" indicates that the surface of the base material is subjected to an oxidizing flame in flame treatment. "Reducing flame" indicates that the surface of the base material is subjected to a reducing flame in the flame treatment. Details of the flame treatment will be described below. Note that in Comparative Example 1, the dry treatment was not performed.

Adhesive Application Step

Next, an adhesive layer (thickness: 3 mm) was formed by directly applying an adhesive described in Table 2 to a surface subjected to the dry treatment of the first member. No primer composition was used at the adhesive application step.

Adhering Step

Further, another coated base material (material: polypropylene) (width: 25 mm, length: 120 mm, thickness: 3 mm) (second member) was made adhere onto the adhesive layer and subjected to compression bonding, and left to stand in an environment of 23° C. and relative humidity of 50% for 3 days. In this way, a multilayer member including the first member, an adhesion layer (layer obtained by curing the adhesive layer) and the second member was obtained.

Evaluation of Adhesiveness

Water Resistance Test or the Like

The multilayer member obtained as described above was subjected to a water resistance test (immersed in 50° C. water for 2 weeks), a heat resistance test (left to stand at 90° C. in an atmosphere for 2 weeks), or a moist heat resistance test (left to stand at 50° C. and relative humidity of 95% RH for 2 weeks).

Peel Test

A peel test of cutting by a knife the adhesion layer of the multilayer member obtained after the water resistance test or the like, and peeling the first member and the second member by hand. Then, a peeled surface was visually observed. A proportion of the area of cohesive failure (CF) and a proportion of the area of interfacial failure (AF) of the peeled surface were examined. The results are indicated in Table 2 (initial).

Evaluation Reference

Here, "CF value" indicates a proportion (%) of the area of cohesive failure, and "AF value" indicates a proportion (%) of the area of interfacial failure. For example, "CF90AF10" indicates that the proportion of the area of cohesive failure is 90% and the proportion of the area of interfacial failure is 10%.

Note that as the proportion of the area of cohesive failure is higher, adhesiveness is more excellent. Practically, the proportion of the area of cohesive failure is preferably 90% or greater, more preferably 95% or greater, and further preferably 100%.

TABLE 2

| | | Comparative Example | | | |
|---|---|---|---|---|---|
| | | 1 | 2 | 3 | 4 |
| Treatment condition | Treatment method | Without treatment | Flame Oxidizing flame | Flame Oxidizing flame | Flame Oxidizing flame |
| | Speed [mm/sec] | — | 400 | 400 | 400 |
| | Overall length of flame [mm] | — | 25 | 25 | 25 |
| | Length of reducing flame [mm] | — | 10 | 10 | 10 |
| | Distance [mm] | — | 20 | 20 | 20 |
| | Number of times | — | 1 | 2 Continuous | 3 Continuous |
| | Gas pressure | — | 0.04 MPa | 0.04 MPa | 0.04 MPa |
| | Wetting index value [dyn/cm] | 28 | 65 | 70 | >73 |
| | Adhesive | 1 | 1 | 1 | 1 |
| Adhesiveness | Water resistance (50° C. 2 W) | Poor AF100 | Poor AF100 | Poor AF100 | Poor AF100 |
| | Heat resistance (90° C. 2 W) | Poor AF100 | Poor AF100 | Poor AF100 | Poor AF100 |
| | Moist heat resistance (50° C. 95% 2 W) | Poor AF100 | Poor AF100 | Poor AF100 | Poor AF100 |

| | | Comparative Example | | | | |
|---|---|---|---|---|---|---|
| | | 5 | 6 | 7 | 8 | 9 |
| Treatment condition | Treatment method | Flame Oxidizing flame | Flame Oxidizing flame | Flame Oxidizing flame | Flame Oxidizing flame | Flame Oxidizing flame |
| | Speed [mm/sec] | 400 | 700 | 700 | 700 | 700 |
| | Overall length of flame [mm] | 25 | 25 | 25 | 25 | 25 |
| | Length of reducing flame [mm] | 10 | 10 | 10 | 10 | 10 |
| | Distance [mm] | 20 | 20 | 20 | 20 | 20 |
| | Number of times | 4 Continuous | 1 | 2 Continuous | 3 Continuous | 4 Continuous |
| | Gas pressure | 0.04 MPa | 0.04 MPa | 0.04 MPa | 0.04 MPa | 0.04 MPa |
| | Wetting index value [dyn/cm] | >73 | 46 | 50 | 54 | 58 |
| | Adhesive | 1 | 1 | 1 | 1 | 1 |

TABLE 2-continued

| Adhesive-ness | Water resistance (50° C. 2 W) | Poor AF100 | Excellent CF100 | Excellent CF100 | Excellent CF100 | Excellent CF100 |
|---|---|---|---|---|---|---|
| | Heat resistance (90° C. 2 W) | Poor AF100 | Fair CF85 AF15 | Fair CF80 AF20 | Fair CF80 AF20 | Fair CF75 AF25 |
| | Moist heat resistance (50° C. 95% 2 W) | Poor AF100 | Excellent CF100 | Good CF95 AF5 | Good CF90 AF10 | Good CF90 AF10 |

| | | Example | | | | | |
|---|---|---|---|---|---|---|---|
| | | 1 | 2 | 3 | 4 | 5 | 6 |
| Treatment condition | Treatment method | Flame Reducing flame | Flame Reducing flame | Flame Reducing flame | Flame Reducing flame | Flame Reducing flame | Flame Reducing flame |
| | Speed [mm/sec] | 400 | 400 | 400 | 400 | 700 | 700 |
| | Overall length of flame [mm] | 25 | 25 | 25 | 25 | 25 | 25 |
| | Length of reducing flame [mm] | 10 | 10 | 10 | 10 | 10 | 10 |
| | Distance [mm] | 5 | 5 | 5 | 5 | 5 | 5 |
| | Number of times | 1 | 2 Continuous | 3 Continuous | 4 Continuous | 1 | 2 Continuous |
| | Gas pressure | 0.04 MPa | 0.04 MPa | 0.04 MPa | 0.04 MPa | 0.04 MPa | 0.04 MPa |
| | Wetting index value [dyn/cm] | 48 | 50 | 54 | 58 | 42 | 46 |
| | Adhesive | 1 | 1 | 1 | 1 | 1 | 1 |
| Adhesive-ness | Water resistance (50° C. 2 W) | Excellent CF100 | Excellent CF100 | Excellent CF100 | Excellent CF100 | Excellent CF100 | Excellent CF100 |
| | Heat resistance (90° C. 2 W) | Excellent CF100 | Excellent CF100 | Good CF90 AF10 | Good CF90 AF10 | Excellent CF100 | Excellent CF100 |
| | Moist heat resistance (50° C. 95% 2 W) | Excellent CF100 | Excellent CF100 | Excellent CF100 | Excellent CF100 | Excellent CF100 | Excellent CF100 |

| | | Example | | | | | | |
|---|---|---|---|---|---|---|---|---|
| | | 7 | 8 | 9 | 10 | 11 | 12 | 13 |
| Treatment condition | Treatment method | Flame Reducing flame | Flame Reducing flame | Flame Reducing flame | Flame Reducing flame | Flame Reducing flame | Flame Reducing flame | Flame Reducing flame |
| | Speed [mm/sec] | 700 | 700 | 400 | 400 | 400 | 400 | 700 |
| | Overall length of flame [mm] | 25 | 25 | 100 | 100 | 100 | 100 | 50 |
| | Length of reducing flame [mm] | 10 | 10 | 40 | 40 | 40 | 40 | 10 |
| | Distance [mm] | 5 | 5 | 30 | 30 | 30 | 30 | 5 |
| | Number of times | 3 Continuous | 4 Continuous | 1 | 2 Continuous | 3 Continuous | 4 Continuous | 2 Continuous |
| | Gas pressure | 0.04 MPa | 0.04 MPa | 2.0 MPa | 2.0 MPa | 2.0 MPa | 2.0 MPa | 0.04 MPa |
| | Wetting index value [dyn/cm] | 50 | 54 | 40 | 46 | 52 | 56 | 46 |
| | Adhesive | 1 | 1 | 1 | 1 | 1 | 1 | 2 |

TABLE 2-continued

| Adhesive-ness | Water resistance (50° C. 2 W) | Excellent CF100 | Excellent CF100 | Excellent CF100 | Excellent CF100 | Excellent CF100 | Excellent CF100 | Excellent CF100 |
|---|---|---|---|---|---|---|---|---|
| | Heat resistance (90° C. 2 W) | Excellent CF100 | Excellent CF100 | Excellent CF100 | Excellent CF100 | Good CF95 AF5 | Good CF90 AF10 | Excellent CF100 |
| | Moist heat resistance (50° C. 95% 2 W) | Excellent CF100 | Excellent CF100 | Excellent CF100 | Excellent CF100 | Good CF95 AF5 | Good CF95 AF5 | Excellent CF100 |

Treatment Conditions

Flame Treatment

Details of the flame treatment in the present example are as follows.

Flame treatment at gas pressure of 0.04 MPa (Examples 1 to 8, 13, Comparative Examples 2 to 9)

In the flame treatment (gas pressure: 0.04 MPa) of Examples 1 to 8, 13 and Comparative Examples 2 to 9, a burner including a tip having a fan shape having the width of an arc of 25 mm and a center angle of 135° was used, and the flame treatment was performed under the conditions described in Table 2 (speed, overall length of flame, length of reducing flame, distance, and number of times, and the same applies hereinafter). Specifically, the burner was moved with respect to a fixed base material, and thus, the burner (flame) swept the base material.

Flame Treatment at Gas Pressure of 2.0 MPa (Examples 9 to 12)

In the flame treatment of Examples 9 to 12 (gas pressure of 2.0 MPa), a burner including a tip having a circular shape having an inner diameter of 6 mm was used, and the flame treatment was performed under the conditions described in Table 2. Specifically, the burner was moved with respect to a fixed base material, and thus, the burner (flame) swept the base material.

Fuel Gas in Flame Treatment

LPG (propane and butane mixed) gas was used as fuel gas in the flame treatment.

Here, speed in Table 2 refers to the speed of the flame treatment, and is specifically the speed [mm/sec] of the burner moved with respect to a fixed base material. Additionally, overall length of flame refers to a length (mm) from a tip of the burner to a tip of the flame (including the oxidizing flame and the reducing flame). Length of reducing flame refers to the length (mm) from the tip of the burner to the tip of the reducing flame (inner flame). Distance refers to the distance [mm] between the tip of the burner and the base material. Additionally, number of times refers to the number of times of sweeping of the burner (flame). For example, the case where the number of times is described as "1" means that the burner swept from one end to the other end of the base material once, and the case where the number of times is described as "2" means that the burner swept from one end to the other end of the base material once, and then swept from the other end to the one end of the base material once. The case where the number of times is 2 or more and is described as "continuous" means that sweeping is repeatedly performed without interval (continuous treatment). Gas pressure refers to the pressure of the fuel gas used in the flame treatment.

Wetting Index Value

In Table 2, "Wetting index value" indicates the wetting index value [dyn/cm] of the surface subjected to the dry treatment of the first member. The wetting index value was measured by using a wetting reagent (available from Wako Pure Chemical Industries, Ltd.).

Evaluation Reference

In an embodiment of the present invention, when the wetting index value is less than 34, the surface of the member is considered to be made insufficiently hydrophilic.

When the wetting index value is 34 or more and 50 or less, it is considered that excessive treatment due to the dry treatment can be suppressed highly, and the surface of the member is very appropriately made hydrophilic, and it is indicated that these are balanced.

When the wetting index value exceeds 50 and is 64 or less, it is considered that excessive treatment due to the dry treatment can be suppressed slightly, or the surface of the member is slightly appropriately made hydrophilic.

When the wetting index value exceeds 64, it is considered that excessive treatment due to the dry treatment cannot be suppressed.

As can be seen from Table 2, the multilayer member obtained by the method of the present example in which the dry treatment was performed satisfying the specific condition exhibited excellent adhesiveness without using a primer.

When the number of times was 2 or less, adhesiveness was very excellent (Examples 1, 2, 5, 6, 9, 10, and 13).

In an embodiment of the present invention, when a wetting index value was from 34 to 64, excellent adhesiveness was able to be obtained.

On the other hand, the multilayer members obtained by the method according to Comparative Example 1 in which the flame treatment was not performed or the methods according to Comparative Examples 2 to 9 in which the dry treatment was performed without satisfying the specific condition had insufficient adhesiveness.

REFERENCE SIGNS LIST

10, 12 First member
10a, 12a Surface of first member
20 Second member
30 Adhesive layer
32 Adhesion layer
100 Multilayer member

The invention claimed is:

1. A method for manufacturing a multilayer member comprising a first member containing a crystalline thermoplastic resin, an adhesive layer, and a second member in this order, the method comprising:
   a surface treatment step of performing dry treatment on a surface of the first member containing the crystalline thermoplastic resin, satisfying condition A;

an adhesive application step of forming the adhesive layer in the surface subjected to the dry treatment of the first member by applying an adhesive to the surface subjected to the dry treatment of the first member without interposing a primer composition; and an adhering step of making the second member adhere onto the adhesive layer;

(Condition A) the dry treatment of the first member is flame treatment, and in the flame treatment, the surface of the first member is subjected to a reducing flame of a flame.

2. The method for manufacturing the multilayer member according to claim 1, wherein the second member is a coated member.

3. The method for manufacturing the multilayer member according to claim 1, wherein the first member is a composite material comprising a polyolefin resin as the crystalline thermoplastic resin, and an inorganic substance.

4. The method for manufacturing the multilayer member according to claim 1, wherein the adhesive is at least one selected from a group consisting of a urethane-based adhesive, an epoxy-based adhesive, a modified silicone-based adhesive, and an acrylic-based adhesive.

5. The method for manufacturing the multilayer member according to claim 1, wherein the second member contains a crystalline thermoplastic resin, the method further comprises a surface treatment step of performing dry treatment on a surface of the second member before the adhering step, satisfying condition A2, and in the adhering step, the surface subjected to the surface treatment of the second member is made to adhere onto the adhesive layer, (Condition A2) the dry treatment of the second member is flame treatment, and in the flame treatment, the surface of the second member is subjected to a reducing flame of a flame.

6. The method for manufacturing the multilayer member according to claim 2, wherein the first member is a composite material comprising a polyolefin resin as the crystalline thermoplastic resin, and an inorganic substance.

7. The method for manufacturing the multilayer member according to claim 2, wherein the adhesive is at least one selected from a group consisting of a urethane-based adhesive, an epoxy-based adhesive, a modified silicone-based adhesive, and an acrylic-based adhesive.

8. The method for manufacturing the multilayer member according to claim 2, wherein the second member contains a crystalline thermoplastic resin, the method further comprises a surface treatment step of performing dry treatment on a surface of the second member before the adhering step, satisfying condition A2, and in the adhering step, the surface subjected to the surface treatment of the second member is made to adhere onto the adhesive layer, (Condition A2) the dry treatment of the second member is flame treatment, and in the flame treatment, the surface of the second member is subjected to a reducing flame of a flame.

9. The method for manufacturing the multilayer member according to claim 3, wherein the adhesive is at least one selected from a group consisting of a urethane-based adhesive, an epoxy-based adhesive, a modified silicone-based adhesive, and an acrylic-based adhesive.

10. The method for manufacturing the multilayer member according to claim 3, wherein the second member contains a crystalline thermoplastic resin, the method further comprises a surface treatment step of performing dry treatment on a surface of the second member before the adhering step, satisfying condition A2, and in the adhering step, the surface subjected to the surface treatment of the second member is made to adhere onto the adhesive layer, (Condition A2) the dry treatment of the second member is flame treatment, and in the flame treatment, the surface of the second member is subjected to a reducing flame of a flame.

11. The method for manufacturing the multilayer member according to claim 4, wherein the second member contains a crystalline thermoplastic resin, the method further comprises a surface treatment step of performing dry treatment on a surface of the second member before the adhering step, satisfying condition A2, and in the adhering step, the surface subjected to the surface treatment of the second member is made to adhere onto the adhesive layer, (Condition A2) the dry treatment of the second member is flame treatment, and in the flame treatment, the surface of the second member is subjected to a reducing flame of a flame.

* * * * *